United States Patent

[11] 3,627,645

[72] Inventors Davide R. Grassetti
Berkeley;
John F. Murray, Jr., San Lorenzo, both of Calif.
[21] Appl. No. 850,688
[22] Filed July 31, 1969
[45] Patented Dec. 14, 1971
[73] Assignee Arequipa Foundation
San Francisco, Calif.
Continuation-in-part of application Ser. No. 779,937, Nov. 29, 1968, now abandoned. This application July 31, 1969, Ser. No. 850,688

[54] METHOD AND REAGENTS FOR THE DETERMINATION OF NICOTINE ADENINE DINUCLEOTIDE PHOSPHATE AND OF GLUTATHIONE
8 Claims, 5 Drawing Figs.
[52] U.S. Cl. ................................... 195/103.5 R, 195/99
[51] Int. Cl. ....................................... G01n 31/14
[50] Field of Search ............................. 195/103.5; 23/230 B; 252/408

[56] References Cited
UNITED STATES PATENTS
3,119,668  1/1964  Ellman .......................... 252/408 X
OTHER REFERENCES
Lowry et al., "J. Biol. Chem." 236: 2754–2755 (1961)

Vennesland, " Methods in Enzymology," Colowick et al., ed.; Vol. II, p. 719 (1955)

*Primary Examiner*—Louis A. Monacell
*Assistant Examiner*—Max D. Hensky
*Attorneys*—D. J. De Witt and Gregg and Hendricson ABSTRACT: The level of nicotine adenine dinucleotide phosphate (NADP) or of glutathione in a given sample is determined spectrophotometrically to extremely low levels, the method employed in testing for either chemical being to add an excess of the other together with a dithiobisheterocyclic reagent chemical as represented, for example, by 2,2'-dithiodipyridine, 6,6'-dithiodinicotinic acid, 6,6'-dithiobis-(isonicotinic acid) or 2,2'-dithiodipyrimidine. Enzyme catalysts to induce cycling of the glutathione and optionally of the NADP are also employed. In analyzing for either chemical the glutathione is converted from the reduced to the oxidized state by the reagent chemical as the latter is irreversibly converted to a product compound which normally possesses a characteristic ultraviolet spectrum. The rate at which said product compound is formed, or at which the reagent compound disappears, is observed spectrophotometrically and is a function of the concentration of the chemical under test. The oxidized glutathione is continuously converted to the reduced form by reaction with reduced NADP in the presence of glutathione reductase. When testing for NADP ( and optionally when testing for glutathione as well) the oxidized NADP formed on reacting with glutathione is continuously converted to the reduced form in the presence of added substrate and dehydrogenase.

INVENTORS
DAVIDE R. GRASSETTI
JOHN F. MURRAY, JR.

METHOD AND REAGENTS FOR THE DETERMINATION OF NICOTINE ADENINE DINUCLEOTIDE PHOSPHATE AND OF GLUTATHIONE

CROSS-REFERENCE TO RELATED PATENT APPLICATION

This application is a continuation-in-part of application, Ser. No. 779,937, filed Nov. 29, 1968 now abandoned.

The invention described herein was made in the course of, or under, a grant from the U.S. Public Health Service, Department of Health, Education, and Welfare.

BACKGROUND OF THE INVENTION

The methods heretofore available for determining the content of NADP or glutathione in sample materials have been relatively complex and time consuming. In contrast, the present method involves a simple one-step process which is adapted to be employed with precision in a routine fashion. The process is accurate at NADP levels as low as $7 \times 10^{-12}$ moles per liter and at levels of glutathione of the order of $3 \times 10^{-}$moles per liter. A comparable sensitivity, at least in the case of NADP, could heretofore be obtained only by the more laborious and costly fluorometric procedures.

SUMMARY OF THE INVENTION

The present invention is directed to the provision of an accurate method for determining the content of nicotine adenine dinucleotide phosphate (hereinafter referred to as NADP) or of glutathione in a sample. The method is one wherein NADP and glutathione are together reacted with a dithiobisheterocyclic reagent compound, of the type hereinafter defined, in the presence of enzyme catalysts which enable the glutathione and optionally the NADP to continuously recycle between the oxidized and the reduced states as the dithiobisheterocyclic reagent is irreversibly converted to a product compound. When testing for glutathione, the reagent compound and glutathione reductase are added to the reaction mixture along with reduced and/or oxidized NADP (the reduced form being referred to as NADPH), a substrate and dehydrogenase for reducing the NADP also being added when NADP is used or when the amount of any added NADPH does not constitute an appreciable excess. In testing for NADP there is added glutathione (preferably in the oxidized GSSG form), the reagent compound, glutathione reductase and the substrate and dehydrogenase for reducing the NADP.

In the reactions which ensue as the sample compound is brought together with the added chemicals, glutathione in its reduced (GSH) form reacts immediately with the dithiobisheterocyclic reagent at ambient temperatures, thereby irreversibly converting this reagent to a product compound which in essentially all cases is a thione compound which builds up in the solution with time. In this reaction, the glutathione is simultaneously converted to the oxidized form (GSSG), this reaction being nonenzymatic. This latter product is then reduced to GSH as it reacts with NADPH in the presence of the added enzyme, glutathione reductase. The GSH so formed is then ready to react anew with the disulfide reagent chemical. In those cases where glutathione is under test, an excess of the NADP is conveniently added to the reaction mixture in the reduced NADPH form, though the latter product can be continuously induced in the mixture by adding NADP together with a suitable substrate and dehydrogenase which will catalytically convert the material from the oxidized NADP form to the reduced NADPH state. Again, somewhat smaller amounts of NADPH than would otherwise be practical can be utilized when the substrate and dehydrogenase are also present. In testing for NADP said substrate and dehydrogenase must always be added in order that the compound present in the sample may continuously recycle from the oxidized to the reduced state and then back to the oxidized condition again as it reacts with oxidized glutathione to form reduced glutathione. The latter compound, in turn, will convert a further increment of the reagent chemical to a thione product, as indicated above.

The rate at which the dithiobisheterocyclic reagent reacts with the reduced glutathione is a function of the concentration in the system of the chemical under test, whether nicotine adenine dinucleotide phosphate or glutathione, said chemical being the one not present in excess. Accordingly, by determining the rate at which the thione is formed or the amount thereof formed in a given unit of time, or by making corresponding measurements regarding disappearance of the reagent chemical, the amount of NADP or glutathione present in the sample can readily be ascertained by reference to curves and other data established with samples containing known concentrations of the particular chemical under test. In the present method these measurements are made spectrophotometrically, and it is a feature of this invention that the dithiobisheterocyclic reagent compounds coming within the scope of the formula given below and/or their reaction products lend themselves well to precise quantitative measurement by the method of spectrophotometric analysis. These dithiobisheterocyclic reagent compounds have the formula:

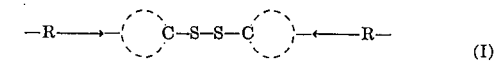

(I)

wherein the

radicals are the same and each represents a heterocyclic (aromatic) radical containing from one to three ring nitrogen atoms and optionally sulfur in the ring, said radicals being substituted or unsubstituted. Representative substituent groups which may be attached to the R groups, which may be single or fused aromatic rings, in addition to hydrogen include oxo, $C_1$—$C_6$ alkyl, $C_1$—$C_6$ alkoxy and thioalkoxy, chloro, bromo, hydroxy, acetamido, nitro, nitroso, amino, sulfo, carboxyl, or the nitrile, salt, ester or amide derivatives of said carboxyl groups. For convenience of description, compounds corresponding to the above formula are referred to herein as "-dithiobisheterocyclic" compounds or more simply as "reagent" compounds.

Dithiobisheterocyclic compounds corresponding to the above formula can readily be prepared by the oxidation of the corresponding precursor compounds wherein the aromatic radical indicated by R, in addition to any other substituent groups which may be present, carries a sulfhydryl group (—SH) attached to a ring carbon atom which is in either a 2- or a 4-position with reference to a nitrogen atom in said ring. In the ensuing oxidation reaction, two molecules of the starting compound link up through the sulfur atoms of the sulfhydryl groups. Conversely, in reacting with a thiol compound the molecule divides between these linking sulfur atoms and the latter become doubly bonded to the carbon atom. This oxidation of the thiol precursor compound to form the dithiobisheterocyclic reagents hereof is readily carried out using the stoichiometrically required amount of hydrogen peroxide or a slight excess, the reaction being conducted at temperatures below about 35° C. in either an aqueous medium or in a solvent such as benzene or acetone in which the said precursor compound is soluble. Alternatively, the oxidation can be effected by the addition of iodine to a solution of the said thiol precursor in an appropriate aqueous or other solvent medium in the presence of sodium iodide or potassium iodide. The iodine can be added either per se or in the form of a solution in aqueous potassium iodide, for example, the reaction being considered complete when the iodine color persists in the stirred solution. The desired reagent product compound can be recovered and purified by conventional methods, the usual practice being to extract the compound from an aqueous reaction product mixture with benzene or other solvent, followed by washing of the extract with water and finally by evaporation of the solvent to recover the desired heterocyclic disulfide in the form of a solid.

Representative dithiobisheterocyclic compounds which can be employed to react with the thiol compound undergoing quantitative analysis in accordance with the method of this invention include: 4,4'-dithiodinicotinic acid, 6,6'-dithiodinicotinic acid, 2,2'-dithiodinicotinic acid, 2,2'-dithiobis-(isonicotinic acid), 6,6'-dithiodipicolinic acid, 4,4'-dithiodipicolinic acid, 2,2'-dithiobis-(5-aminopyridine), 2,2'-dithiodipyridine-di-N-oxide, 6,6'-dithiodinicotinic acid ethyl ester, 4,4'-dithiodinicotinic acid isopropyl ester, 6,6'-dithiodinicotinic acid methyl ester, 2,2'-dithiodinicotinic acid methyl ester, 6,6'-dithiodinicotinic acid n-butyl ester, 6,6'-dithiodinicotinic acid n-hexyl ester, 4,4'-dithiodinicotinic acid sodium salt, 6,6'-dithiodinicotinic acid sodium salt, 2,2'-dithiodinicotinic acid sodium salt, 6,6'-dithiodinicotinic acid potassium salt, 6,6'-dithiodinicotinic acid magnesium salt, 6,6'-dithiodinicotinic acid ammonium salt, 6,6'-dithiobis-(4-methylnicotinic acid), 6,6'-dithiobis-(4-n-hexylnicotinic acid), 6,6'-dithiodinicotinamide, 2,2'-dithiodinicotinamide, 4,4'-dithiodinicotinamide, 6,6'-dithiodipicolinamide, 4,4'-dithiodipicolinamide, 6,6'-dithiodipicolinonitrile, 4,4'-dithiodipicolinonitrile, 6,6'-dithiodinicotinonitrile, 2,2'-dithiodinicotinonitrile, 4,4'-dithiodinicotinonitrile, 6,6'-dithiobis-(isonicotinonitrile), 6,6'-dithiodipicolinic acid methyl ester, 4,4'-dithiodipicolinic acid ethyl ester, 6,6'-dithiodipicolinic acid sodium salt, 4,4'-dithiodipicolinic acid potassium salt, 2,2'-dithiodiquinoline, 2,2'-dithiobis-(4-methylthiazole), 2,2'-dithiodithiazole, 2,2'-dithiodiimidazole, 2,2'-dithiobis-(5-carboxypyrimidine), 2,2'-dithiobis-(4-pyridinesulfonic acid), 2,2'-dithiodipyrimidine, 2,2'-dithiobis-(4-methylpyrimidine), 2,2'-dithiodipyrazine, 4,4'-dithiobis-(1,2,3-triazine), 2,2'-dithiodipyridine, 4,4'-dithiodipyridine, 2,2'-dithiobis-(5-nitropyridine), 5,5'-dithiobis-(1,2,4-triazole), 2,2'-dithiobis-(4-methoxypyridine), 2,2'-dithiobis-(4-(methylthio)pyridine), 2,2'-dithiobis-(4,6-dichloropyridine), 2,2'-dithiobis-(5-acetamidopyridine), 2,2'-dithiobis-(4-pyridinol), 2,2'-dithiobis-(4-nitropyridine), 2,2'-dithiobis-(4-nitrosopyridine), 2,2'-dithiodiquinazoline, 4,4'-dithiodiquinazoline, 2,2'-dithiobis-(5-ethoxyquinazoline), 2,2'-dithiodibenzimidazole, 2,2'-dithiobis-(4-hydroxybenzimidazole), 1,1'-dithiodiisoquinoline, 8,8'-dithiobis-(4-acetoxyisoquinoline), 1,1'-dithiobis-(3-methylisoquinoline), 3,3'-dithiobis-(6-methylpyridazine), 3,3'-dithiodipyridazine, 3,3'-dithiobis-(6-cyanopyridazine), 2,2'-dithiobis-(4-acetoxyimidazole), 5,5'-dithiobis-(3-carboxypyrazole), 5,5'-dithiodipyrazole, 2,2'-dithiobis-(pyrazine-di-N-oxide), 2,2'-dithiodipteridine, 2,2'-dithiodipurine, and 2,2'-dithiobis-(4-carboxypyrimidine).

The reactions which take place between a dithiobisheterocyclic reagent, glutathione, nicotine adenine dinucleotide phosphate and a substrate for oxidizing the latter can be represented by the following diagram wherein 6,6'-dithiodinicotinic acid is the reagent chemical:

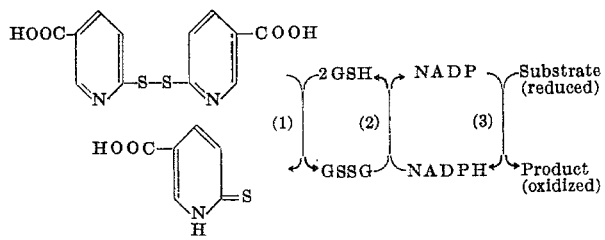

In reaction (1) of the above system, one molecule of the dithiobisheterocyclic reagent chemical is converted noncatalytically to two molecules of 6-thiononicotinic acid, the buildup of which in the system is followed spectrophotometrically. At the same time, the reduced form of glutathione (GSH) is converted to the oxidized form, GSSG. Simultaneously, in reaction (2) which is catalyzed by glutathione reductase (EC 1.6.4.2), the oxidized glutathione is converted by reduced nicotine adenine dinucleotide phosphate (NADPH) to reduced glutathione (GSH), the phosphate compound being simultaneously converted to the oxidized form, NADP. In reaction (3), which is necessarily employed in analyzing for said phosphate compound and which is optionally employed in analyzing for glutathione, the oxidized NADP product is reduced to the NADPH form in the presence of a suitable substrate and dehydrogenase. Examples of the latter include glucose-6-phosphate and glucose-6-phosphate dehydrogenase (EC 1.1.1.49), 6-phosphogluconate and 6-phosphogenconate dehydrogenase (EC 1.1.1.44); and isocitrate and isocitrate dehydrogenase (EC 1.1.1.42), the numbers in parentheses being the official code number of each enzyme.

In the system presented diagrammatically above, the reaction product which builds up in the system is 6-thiononicotinic acid. The ultraviolet spectrum of this product has a peak at 344 mμ which can usefully be employed in the conventional methods of spectrophotometric analysis to calculate the amount of said product which is present in the reaction mixture at any given time. The reagent chemical 6,6'-dithiodinicotinic acid which gives rise to said product has an ultraviolet spectrum having a peak at 251 mμ which may also be followed in the analysis to determine the disappearance of said reagent chemical, said data correlating with that observed for the appearance of the thione product. Similar data are presented in the following table for other heterocyclic disulfide reagent compounds and for their corresponding reaction products. It is believed that all the latter are heterocyclic thiones with the possible exception of that produced from 2,2'-dithiobis-(benzimidazole), where the nature of the product is still undetermined.

TABLE

| Dithiobisheterocyclic reagent compound | Useful wavelength (mμ) in calculations based on— | |
|---|---|---|
| | Disappearance of reagent compound | Formation of product compound |
| 2,2'-dithiodipyridine | 233 | 343 |
| 4,4'-dithiodipyridine | 247 | 324 |
| 2,2'-dithiodipyridine-di-N-oxide | 234 | 244, 282, 332 |
| 6,6'-dithiodinicotinic acid | 251 | 344 |
| 6,6'-dithiobis-(isonicotinic acid) | 300 | 273, 365 (325–420) |
| 6,6'-dithiodinicotinamide | 252 | 310–380 |
| 2,2'-dithiobis-(5-aminopyridine) | 253, 311 | 279, 371 |
| 2,2'-dithiodiquinoline | 230–255, 320 | 276, 384 (340–430) |
| 2,2'-dithiodipyrimidine | 238 | 277 |
| 2,2'-dithiobis-(4-methylpyrimidine) | 239 | 278 |
| 2,2'-dithiobis-(4-methylthiazole) | 272 | 311 |
| 2,2'-dithiobis-(benzimidazole) | [1] 330 | 242, 299 |
| 2,2'-dithiobis-(5-acetamidopyridine) | 260 | 295, 372 |
| 6,6'-dithiobis-(nicotinonitrile) | 260 | 325 |
| 2,2'-dithiobis-(4-carboxypyrimidine) | 238 | 277 |

[1] Shoulder.

The temperature at which the reaction takes place between the dithiobisheterocyclic compound, glutathione and NADP is not critical, and good results can be had, for example, over a range of from about 20° to 40° C. However, since the data obtained are to be compared with reference data as provided by standards of known concentration, the reaction should be conducted at the same temperature as employed with the standards. Ambient temperatures of about 25° C. are preferred.

The pH of the reaction mixture within a relatively broad operable range of from about 6.0 to 9.0 is not critical, and buffers can be employed, if desired, to maintain the pH at the level within this range which is optimum for the given enzymes employed. These levels vary with the source of each enzyme, as known to those skilled in the art. In the case of glutathione reductase obtained from e. coli this optimum pH value is 6.9, while with materials produced from wheat germ and yeast, these values are 7.5–8.0. With glucose-6-phosphate dehydrogenase obtained from yeast the optimum pH level is 8.5, while the level with material prepared from other sources ranges from 7.6 to 8.6. The optimum pH level for 6-phosphogluconate dehydrogenase prepared from yeast is 7.4, while that of isocitrate dehydrogenase prepared from pig heart is 7.7. Good results with all the foregoing enzymes can be obtained within a pH range of from about 7.0 to 8.0.

All work conducted in accordance with the process of this invention is done in an essentially aqueous system, and the use of other liquids in concentrations which may tend to destroy or inhibit the enzymes present is to be avoided.

The relative amount of each reagent employed in making the analyses can be extremely small. Thus, it is only necessary to add an amount of each chemical which will ensure that the concentration of the chemical under analysis is the rate limiting factor. In general, however, good results have been obtained using the following concentrations: dithiobisheterocyclic reactant, about 0.05 to 1.5 g. per liter; reduced glutathione, about 0.008 to 0.02 g. per liter; oxidized glutathione, about 0.2 to 0.6 g. per liter; glucose-6-phosphate, about 0.1 to 0.5 g. per liter; NADP or NADPH, about 0.01 to 0.05 g. per liter; and the enzymes, about 150 to 1,500 IU per liter each. The NADP or NADPH and the glucose-6-phosphate are customarily added in the form of the corresponding sodium salts.

It forms a feature of the present method that despite the presence in the sample of extremely small amounts of the chemical under test, relatively large amount of the thione product builds up in the system with time. Thus, it has been found in working with the reagent chemical 2,2'-dithiodipyridine and testing for the presence of NADP (both reduced and oxidized) in the sample, that in 2 hours at 25° C. about 1,000 moles of 2-thiopyridone accumulate in the system for each mole of the NADP present. Similarly, in testing for glutathione (both reduced and oxidized) in the sample, in approximately 5 minutes at 25° C. 70 moles of 2-thiopyridone accumulate in the system for each mole of glutathione present. The advantages of this multiplication factor from an analytical standpoint are obvious, for while the net amount of the thione product may still be relatively small in absolute terms, it can still be measured with accuracy.

Data obtained in working with known concentrations of glutathione and of nicotine adenine dinucleotide phosphate (each added in oxidized form) are presented in the several figures of the drawings. In each case the dithiobisheterocyclic reagent compound employed was 2,2'-dithiodipyridine, and the reaction was conducted at 25° C. in an aqueous solution buffered at pH 7.5 in a 3-ml. spectrophotometer cuvette. Determinations were made in a Beckman spectrophotometer, model DU, of the 2-thiopyridone content of the system as evidenced by absorption at 343 m$\mu$. The data obtained are plotted in typical fashion in the several figures so as to obtain standards against which to compare the absorbency values obtained in working with a given sample and thus determine its concentration of NADP or glutathione.

Referring now specifically to the drawings,

FIG. 1 illustrates the absorbency values at 343 m$\mu$ observed with solutions containing varying levels of GSSG, as indicated, over time periods ranging from 1 to 7 minutes, each cuvette also containing 3.0 micromoles of the dithiobisheterocyclic reagent, 0.10 micromole of NADPH and 3.0 IU of glutathione reductase, the absorbency being measured in each case until the reaction ceased as the supply of NADPH was exhausted;

FIG. 2 is a calibration curve obtained by plotting rate of increase in absorbency at 343 m$\mu$ in the linear range (0 to 2 minutes), as presented in FIG. 1, versus the amount of GSSG per cuvette, and showing the increase in initial rates of 2-thiopyridone formation with GSSG concentration;

FIG. 3 illustrates the absorbency values at 343 m$\mu$ observed with solutions containing varying levels of NADP, as indicated, over time periods ranging from about one-half to 60 minutes, each cuvette containing 1.4 micromole of the dithiobisheterocyclic reagent, 1.4 micromole of GSSG, 2.0 micromole of glucose-6-phosphate, 1.5 IU of glutathione reductase and 1.5 IU of glucose-6-phosphate dehydrogenase, each run being terminated at the indicated time;

FIG. 4 is a calibration curve obtained by plotting 343 m$\mu$ absorbency at 20 minutes (as presented in FIG. 3), amount NADP per cuvette, and showing the increase in rates of 2-thiopyridone formation with NADP concentration; and FIG. 5 is a curve which is otherwise the same as that of FIG. 3, except that here the reaction interval is extended to 360 minutes for the two relatively dilute NADP systems shown.

The various chemicals employed in the analyses can be combined with the sample in any order, provided, however, that the enzymes should be added last.

The analytical methods here disclosed can most conveniently be practiced using a kit or other package which contains all the materials required to perform one or both of the NADP and glutathione analyses. Accordingly, it forms a feature of this invention to provide preassembled materials of this character. Thus, the package for determining glutathione would include the dithiobisheterocyclic reagent compound, glutathione reductase and one or both of NADP and NADPH; also included would be a suitable substrate and dehydrogenase when NADP is included in the package, said materials being optionally included when the phosphate reagent is NADPH.

The package for determining nicotine adenine dinucleotide phosphate would include the dithiobisheterocyclic reagent compound, glutathione in either reduced or oxidized form; glutathione reductase and a substrate and appropriate dehydrogenase to effect reduction of the NADP in the sample. A universal kit for use in making both determinations would include the dithiobisheterocyclic reagent compound, glutathione (oxidized or reduced), nicotine adenine dinucleotide phosphate (oxidized or reduced), glutathione reductase and a suitable substrate and dehydrogenase for the said phosphate.

Preferred kits are those which contain the ingredients as shown below in amounts indicated for a single test. A 10-run kit would, of course, contain 10 times these amounts, etc.

For Determination of Glutathione

| | |
|---|---|
| 1. NADP Na salt (oxidized or reduced) | 0.04 to 0.15 mg. |
| 2. glucose-6-phosphate, Na salt (or other substrate) | 0.3 to 1.5 mg. |
| 3. dithiobisheterocyclic reagent compound | 0.2 to 4.0 mg. |

For Determination of NADP

| | |
|---|---|
| 1. glutathione (reduced) or | 0.025 to 0.05 mg. |
| 2. glutathione (oxidized) | 0.5 to 2.5 mg. |

PLUS, For Determination of Either Glutathione or NADP

| | |
|---|---|
| 1. glutathione reductase | 0.5 to 5.0 IU |
| 2. glucose-6-phosphate dehydrogenase or equivalent | 0.5 to 5.0 IU |

It should be observed that while NADP is stable to acid, this is not true of the reduced product, NADPH. Accordingly, the latter should be mixed with acid (e.g., 6,6'-dithiodinicotinic acid) only when the acid is present as a salt or when the system contains a neutral buffer. Certain enzymes (notably glutathione reductase) may contain glutathione as an impurity, and it is recommended that this factor be taken care of by running a blank without the sample to be analyzed, and then subtracting the result from the ultimate analysis. The dithiobisheterocyclic reagent may react with the enzyme; and therefore, the recommended practice is to add the enzyme to the reaction mixture last. The dithiobisheterocyclic reagent compounds tend to be unstable in aqueous solution. Thus, they should be stored in the dried solid state.

DESCRIPTION OF THE PREFERRED EMBODIMENTS

Figure 1:
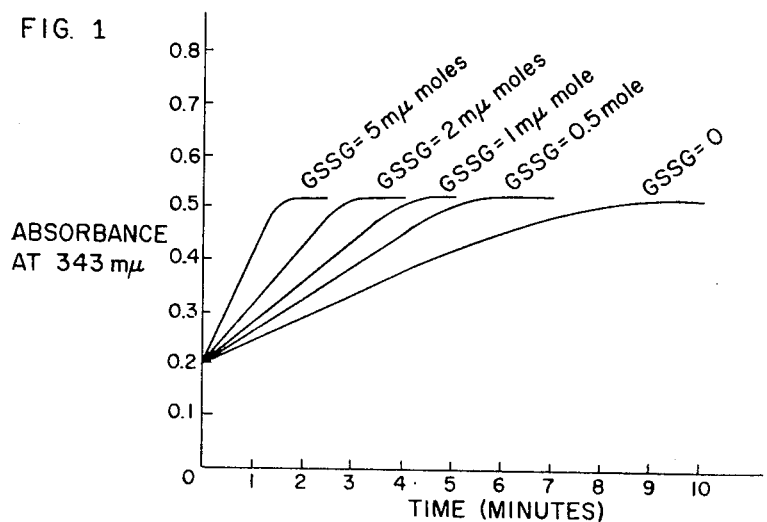
Figure 2:
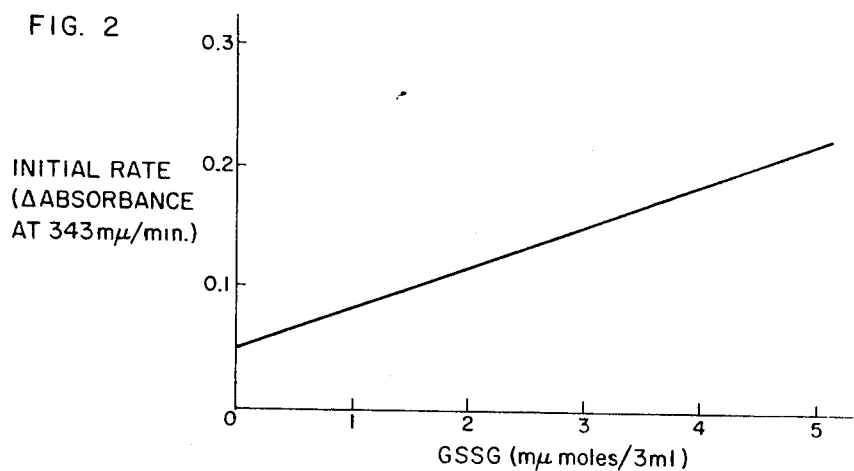
Figure 3:
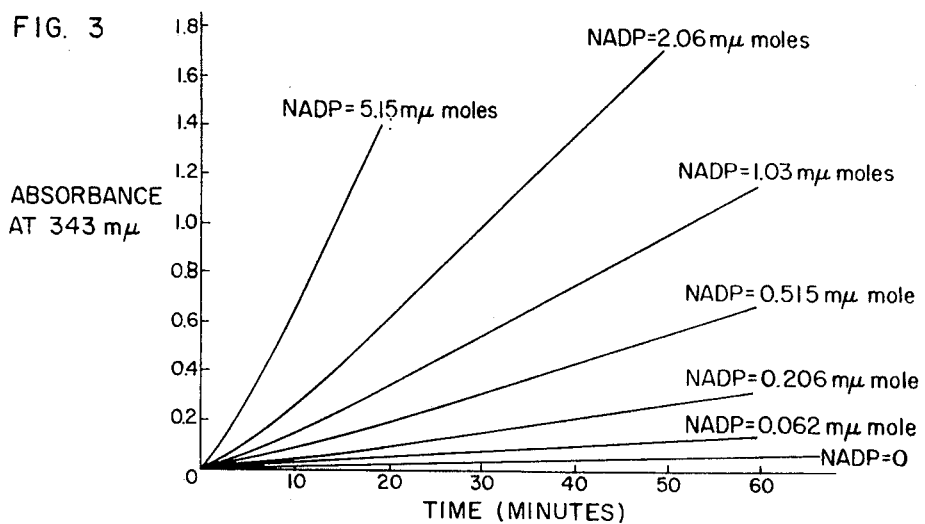
Figure 4:
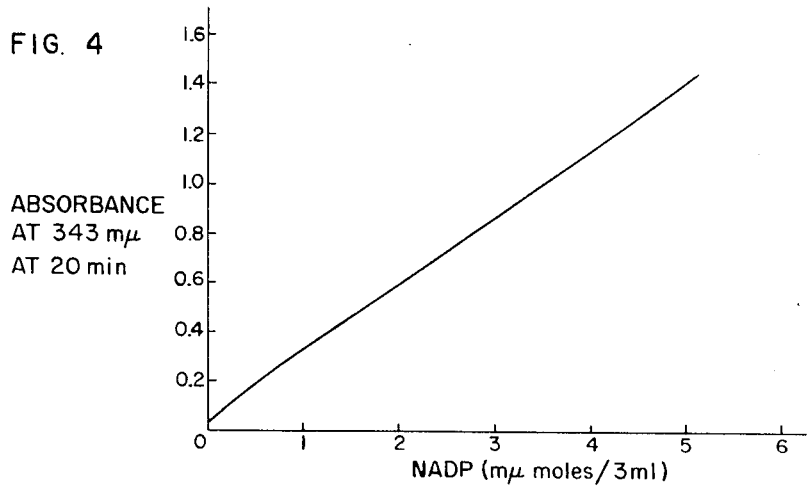
Figure 5:
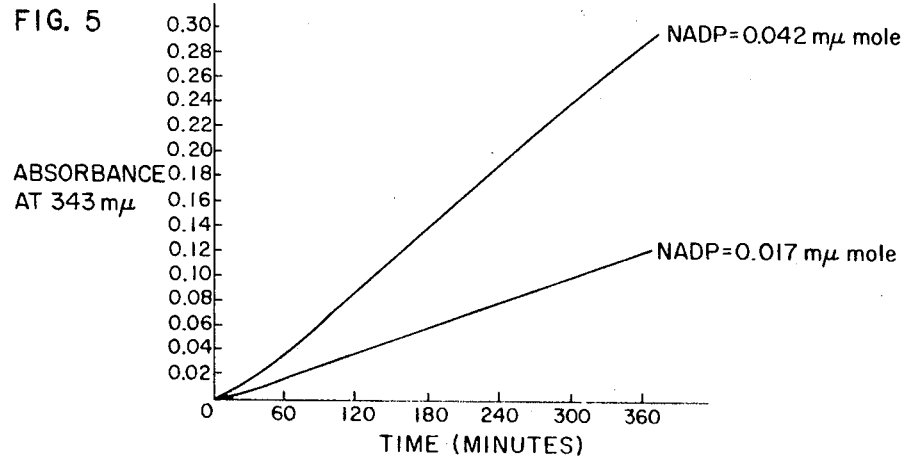

The following examples illustrate the invention in various of its embodiments but are not to be construed as limiting:

EXAMPLE 1

A kit designed for 10 determinations of NADP can have the following composition:

| Vial A. | 6,6'-dithiodinicotinic acid | 4.6 mg. |
|---|---|---|
| | oxidized glutathione | 9.2 mg. |
| | glucose-6-phosphate, disodium salt, trihydrate | 7.2 mg. |

These three compounds are contained in solid form. For use, dissolve the contents of the vial in 10 ml. of aqueous buffer (0.1 M., pH 7.5) to obtain solution A.

| Vial B. | Glutathione reductase | 15 International Units |
|---|---|---|
| | Glucose-6-phosphate dehydrogenase | 15 International Units |

The contents of vial B are in the form of an aqueous ammonium sulfate suspension, total volume 0.1 milliliter.

Procedure. In a standard spectrophotometer 3-ml. cuvette directly mix 1.0 ml. of solution A with the sample to be tested for NADP. Dilute to 3.0 ml. with aqueous buffer, pH 7.5. Measure the initial absorbance at 344 m$\mu$, add 0.01 ml. of the solution of vial B and mix the cuvette contents. Record the increase in absorbance at 344 m$\mu$ versus time. Compare the rate of increase with known standards to determine NADP content.

EXAMPLE 2

A kit designed for 10 determinations of glutathione can have the following composition:

| Vial A. | 2,2'-dithiodipyridine or 4,4'-dithiodipyridine (powder) | 6.6 mg. |
|---|---|---|

For use, dissolve in 15 ml. of aqueous phosphate buffer, pH 7.5, heating gently as required, to obtain solution A.

| Vial B. | NADPH, tetrasodium salt | 0.8 mg. |
|---|---|---|

For use, dissolve in 1.0 ml. of aqueous phosphate buffer, pH 7.5, to obtain solution B.

| Vial C. | Glutathione reductase | 30 International Units |
|---|---|---|
| | (0.10 ml. of aqueous ammonium sulfate susp.) | |

Procedure. Mix 1.5 ml. of solution A and 0.1 ml. of solution B with the sample to be tested (previously brought to pH 7.5), directly in a 3-ml. spectrophotometer cuvette. Dilute to 3.0 ml. with aqueous buffer, pH 7.5 and add 0.01 ml. of the solution of vial C. Record the rate of increase of absorbance at 343 m$\mu$. Compare against a known standard of glutathione.

EXAMPLE 3

A kit for making 10 glutathione determinations can have the following composition:

| Vial A. | 6,6'-dithiodinicotinic acid | 9.2 mg. |
|---|---|---|
| | (or, alternatively, 11.2 milligrams of its disodium salt) | |
| | NADPH, tetrasodium salt | 0.8 mg. |

For use, dissolve in 16 ml. of aqueous phosphate buffer, pH 7.5, to provide solution A.

| Vial B. | Glutathione reductase | 30 International Units |
|---|---|---|
| | (0.10 ml. aqueous ammonium sulfate suspension) | |

Procedure. Mix 1.5 ml. of solution A with the sample to be tested (previously brought to pH 7.5), directly in a 3-ml. spectrophotometer cuvette. Dilute to 3.0 ml. with aqueous buffer, pH 7.5, and add 0.01 ml. of the solution of vial B. Record the rate of increase of absorbance at 344 m$\mu$. Compare against a known standard of glutathione.

If 6,6'-dithiobis-(isonicotinic acid) is used above in lieu of the corresponding nicotinic acid compound, the amount of NADPH can be increased (e.g., tenfold), thus allowing a higher cycling yield and therefore a greatly increased sensitivity in the determination of glutathione. The formation of the isonicotinic acid thione can be followed in the range between 325 and 420 m$\mu$, thus avoiding interference with the UV absorption of TPNH which has virtually none at wavelengths above 385 m$\mu$.

EXAMPLE 4

A kit designed for 10 determinations of glutathione can have the following composition:

| Vial A. | 6,6'-dithiodinicotinic acid | 4.6 mg. |
|---|---|---|
| | glucose-6-phosphate (Na salt) | 7.2 mg. |
| | NADP, tetrasodium salt | 0.8 mg. |
| Vial B. | Glutathione Reductase | 15 IU |
| | Glucose-6-phosphate dehydrogenase | 15 IU |
| | (both in 0.1 ml. of aqueous ammonium sulfate suspension) | |

Procedure. Dissolve vial A in 10 ml. of aqueous phosphate buffer, pH 7.5. Thereafter, 0.01 ml. of vial B is added to a solution of the sample to be analyzed, the total volume is brought to 2.0 ml. with the same buffer and 1.0 ml. of solution A is added. The rate of increase of absorbance at 344 m$\mu$ is recorded and compared with known standards.

The advantages of this method are as follows:

a. The cycling yield can be increased relatively to procedures of examples 2 and 3 because in this case we do not need to add large initial amount of NADPH, which absorbs at same $\lambda$ as the disulfide. Here NADP is added and the NADPH is continuously generated.

b. Since the amount of NADPH is kept constant, the rate curves are dependent only on the formation of the thione and the disappearance of NADPH supply cannot affect rate of the reaction as is sometimes the case.

EXAMPLE 5

A kit designed for 10 determinations of glutathione can have the following composition:

| Vial A. | 6,6'-dithiodinicotinic acid | 4.6 mg. |
|---|---|---|
| | glucose-6-phosphate, Na salt | 7.2 mg. |
| | glutathione, reduced form | 0.5 mg. |
| Vial B. | glutathione reductase | 15 IU |
| | glucose-6-phosphate dehydrogenase | 15 IU |
| | (0.1 ml. of aqueous ammonium sulfate suspension) | |

Procedure. Same as example 1.

EXAMPLE 6

A kit designed for 10 determinations of either glutathione or NADP can have the following composition:

| Vial A. | 6,6'-dithiodinicotinic acid | 4.6 mg. |
|---|---|---|
| | glucose-6-phosphate, Na salt | 7.2 mg. |
| | NADP, Na salt | 0.8 mg. |
| Vial B. | 6,6'-dithiodinicotinic acid | 4.6 mg. |
| | glucose-6-phosphate, Na salt | 7.2 mg. |
| | glutathione, reduced form | 0.5 mg. |
| Vial C. | glutathione reductase | 15 IU |
| | glucose-6-phosphate dehydrogenase | 15 IU |
| | (both in 0.1 ml. of ammonium sulfate suspension) | |

Procedure.

For determination of glutathione: use vials A and C, following instructions given for example 4.

For determination of NADP: use vials B and C, following directions given for example 1.

We claim:

1. The method for the quantitative analytical determination of one or both of glutathione and nicotine adenine dinucleotide phosphate in sample materials, said method in analyzing for glutathione including the step of reacting the sample in the presence of glutathione reductase with an excess of a dithiobisheterocyclic reagent compound and of reduced nicotine adenine dinucleotide phosphate added as such or formed in the reaction mixture from oxidized nicotine adenine dinucleotide phosphate in the presence of added substrate and its dehydrogenase, and in analyzing for nicotine adenine dinucleotide phosphate including the step of reacting the sample with an excess of said reagent compound and of glutathione in the presence of glutathione reductase together with said substrate and its dehydrogenase; determining by spectrophotometric means the extent to which the said reagent compound has reacted with glutathione in either analysis in a given unit of time; and comparing the data so obtained with that of known standards to determine the content of glutathione or of nicotine adenine dinucleotide phosphate in the sample.

2. The method as in claim 1 wherein the sample and the reactants are brought together, with the enzymes being added last, in an aqueous reaction medium having a pH of from about 6.0 to 9.0, and wherein the dithiobisheterocyclic reagent compound is one having the formula

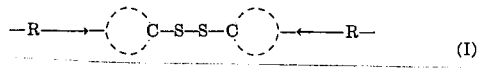 (I)

wherein the

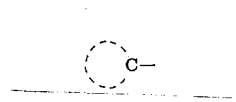

radicals are the same and each represents a heterocyclic aromatic radical containing from one to three ring nitrogen atoms and optionally sulfur in the ring.

3. The method as in claim 2 wherein the dithiobisheterocyclic reagent compound is a member selected from the group consisting of 2,2'-dithiodipyridine, 4,4'-dithiodipyridine, 6,6'-dithiodinicotinic acid, 6,6'-dithiobis-(isonicotinic acid) and the sodium salts of said acids.

4. A package of chemicals for determining the content of glutathione in a sample, said package containing (1) at least one dithiobisheterocyclic reagent compound of the type having the formula

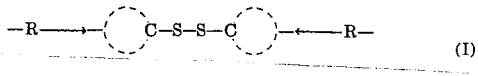 (I)

wherein the

radicals are the same and each represents a heterocyclic aromatic radical containing from one to three ring nitrogen atoms and optionally sulfur in the ring, (2) glutathione reductase and (3) a source of reduced nicotine adenine dinucleotide phosphate.

5. A package as in claim 4 wherein the dithiobisheterocyclic reagent compound is selected from the group consisting of 2,2'-dithiodipyridine, 4,4'-dithiodipyridine, 6,6'-dithiodinicotinic acid, 6,6'-dithiobis-(isonicotinic acid) and the sodium salts of said acids.

6. A package of chemicals for determining the content of nicotine adenine dinucleotide phosphate in a sample, said package containing (1) at least one dithiobisheterocyclic reagent compound of the type having the formula

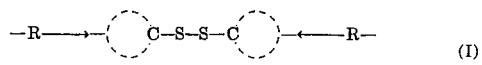 (I)

wherein the

radicals are the same and each represents a heterocyclic aromatic radical containing from one to three ring nitrogen atoms and optionally sulfur in the ring, (2) glutathione, (3) glutathione reductase, and (4) a substrate and dehydrogenase capable of reducing oxidized nicotine adenine dinucleotide phosphate.

7. A package as in claim 6 wherein the dithiobisheterocyclic reagent compound is selected from the group consisting of 2,2'-dithiodipyridine, 4,4'-dithiodipyridine, 6,6'-dithiodinicotinic acid, 6,6'-dithiobis-(isonicotinic acid) and the sodium salts of said acids.

8. A package as in claim 6 which additionally includes nicotine adenine dinucleotide phosphate and is adapted to be employed in the determination both of glutathione and nicotine adenine dinucleotide phosphate.

* * * * *

UNITED STATES PATENT OFFICE
CERTIFICATE OF CORRECTION

Patent No. 3,627,645   Dated December 14, 1971

Inventor(s) Davide R. Grassetti et al

It is certified that error appears in the above-identified patent and that said Letters Patent are hereby corrected as shown below:

Column 2, line 24, amend formula (I) by cancelling the symbols "-R →" and "← R-" at the ends, line 39, cancel "R groups" and insert -- C-radicals--; line 51, cancel "R" and insert -- -- C- --; claims 2, 4 and 6, in the structural formula, cancel the symbols "-R →" and "← R-".

Signed and sealed this 19th day of December 1972.

(SEAL)
Attest:

EDWARD M. FLETCHER, JR.
Attesting Officer

ROBERT GOTTSCHALK
Commissioner of Patents